United States Patent
Tetzlaff et al.

(10) Patent No.: US 9,503,249 B2
(45) Date of Patent: Nov. 22, 2016

(54) FULL DUPLEX WIRELESS COMMUNICATIONS ON DEVICES WITH LIMITED ECHO CANCELLATION CAPABILITIES

(71) Applicant: Intel IP Corporation, Santa Clara, CA (US)

(72) Inventors: Thomas A. Tetzlaff, Portland, OR (US); Eldad Perahia, Portland, OR (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 94 days.

(21) Appl. No.: 14/335,396

(22) Filed: Jul. 18, 2014

(65) Prior Publication Data

US 2016/0020894 A1    Jan. 21, 2016

(51) Int. Cl.
| | |
|---|---|
| H04B 7/01 | (2006.01) |
| H04L 1/16 | (2006.01) |
| H04L 5/14 | (2006.01) |
| H04L 1/00 | (2006.01) |
| H04B 7/015 | (2006.01) |

(52) U.S. Cl.
CPC ............. *H04L 5/1461* (2013.01); *H04B 7/015* (2013.01); *H04L 1/0003* (2013.01); *H04L 1/0009* (2013.01); *H04L 1/1635* (2013.01)

(58) Field of Classification Search
CPC .......... H04B 7/015; H04L 2012/6491; H04L 1/1614–1/1635
See application file for complete search history.

(56) References Cited

U.S. PATENT DOCUMENTS

| | | | |
|---|---|---|---|
| 2007/0155334 A1 | 7/2007 | Chang et al. | |
| 2009/0190609 A1 | 7/2009 | Basso et al. | |
| 2009/0290516 A1* | 11/2009 | Han ..................... | H04B 1/1027 370/277 |
| 2013/0223294 A1 | 8/2013 | Karjalainen et al. | |
| 2015/0109969 A1* | 4/2015 | Celebi .................. | H04L 5/0085 370/278 |
| 2015/0244505 A1* | 8/2015 | Celebi .................. | H04W 52/36 370/277 |

FOREIGN PATENT DOCUMENTS

| | | |
|---|---|---|
| TW | 201607266 A | 2/2016 |
| WO | WO-2011019571 A1 | 2/2011 |
| WO | WO-2016010675 A1 | 1/2016 |

OTHER PUBLICATIONS

Chi-Cheng Lin, CS 313 Introduction to Computer Networking & Telecommunication—Data Link Layer Part II—Sliding Window Protocols, 2011, 39 pages.*
"International Application Serial No. PCT/US2015/036662, International Search Report mailed Oct. 5, 2015", 4 pgs.
"International Application Serial No. PCT/US2015/036662, Written Opinion mailed Oct. 5, 2015", 8 pgs.

* cited by examiner

*Primary Examiner* — Hoon J Chung
(74) *Attorney, Agent, or Firm* — Schwegman Lundberg & Woessner, P.A.

(57) ABSTRACT

Disclosed in some examples are methods, systems, and machine readable mediums which allow for wireless devices with limited echo cancellation capabilities to participate in full-duplex communications. In some examples, by carefully controlling transmission powers and the modulation and coding schemes (MCS) used in the transmissions, both devices can engage in full-duplex communication.

10 Claims, 5 Drawing Sheets

FULL DUPLEX WIRELESS COMMUNICATIONS ON DEVICES WITH LIMITED ECHO CANCELLATION CAPABILITIES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Intel, Inc., All Rights Reserved.

TECHNICAL FIELD

Embodiments pertain to wireless communications. Some embodiments relate to full duplex wireless communications.

BACKGROUND

Wireless communications are currently only half-duplex, that is, each wireless device can transmit data and receive data, but not at the same time and on the same frequency. This is because transmissions from the wireless device significantly overwhelm any signals received at the transmitting wireless device which are sent from other wireless devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Recent technological developments in echo cancellation allow a wireless device to minimize the impact of its own transmitted signal on a signal received from another wireless device. These developments allow for implementing wireless networks which both transmit and receive at the same time and on the same frequency, referred to herein as full duplex communications.

Full duplex operation is possible if the wireless device reduces interference from its own transmissions to a level such that successful reception can take place. This is called "echo cancelling." Whether or not a transmission may be sufficiently echo cancelled such that a device may also receive a transmission at the same time and on the same frequency may depend on the transmission power of the transmission that is to be cancelled; the amount of cancellation the device is capable of; the incoming received signal power; and the modulation and coding scheme (MCS) of the received signal.

Lower cost wireless devices are likely to have limited echo-cancellation capabilities in that it may not be capable of reducing interference from its own transmissions down to its receiver's noise floor for transmissions that are sent above a certain transmission power. This is due to the limited capabilities of its echo cancellation circuitry. Despite these limitations, there are many situations in which full duplex communication can be achieved using lower amounts of echo cancellation which the wireless device is capable of. Example situations include communications between a device with more echo cancellation capability and a device with less echo cancellation capabilities (e.g., a mobile device and fixed Access Point (AP)); situations in which the wireless medium allows for the use of transmission powers that are below the amount of echo cancellation the communicating devices are capable of; and the like.

Disclosed in some examples are methods, systems, and machine readable mediums which allow for wireless devices with limited echo cancellation capabilities to participate in full-duplex communications. In some examples, by carefully controlling transmission powers and the modulation and coding schemes (MCS) used in the transmissions, both devices can engage in full-duplex communication. As used herein the term "wireless device with limited echo cancellation capabilities," is a device that is not capable of cancelling out interference from transmissions at maximum power to a level at or below the receiver's noise floor. As such, successful full duplex operation requires either received signals that are stronger than the minimum sensitivity level or lower transmission powers, or a combination of the two. For example, consider a wireless device with a 20 dBm max transmit power, and a noise floor of −90 dBm. If this wireless device had full echo cancellation, it could reduce the interference from a 20 dBm transmission to −90 dBm, and thus still be capable of receiving nearly any frame that it could receive when not transmitting. If this device had limited echo cancellation, say 90 dB, it could only reduce the interference of a 20 dBm transmission to −70 dBm. This device would need a received signal strength that is 20 dB higher to successfully receive a transmission. Alternatively, it could reduce its transmit power to 0 dBm and be able to cancel this to −90 dBm, and still receive all frames.

In some examples, prior to engaging in full-duplex communications, and in some examples, periodically while engaging in the full-duplex communications, one of the wireless devices participating in the wireless communication may establish, based upon the capabilities of the communicating wireless devices and other factors, the most complex Modulation and Coding Scheme (MCS) that can be used to communicate in full-duplex mode. This wireless device may be hereinafter referred to for convenience as a controlling wireless device. In order to establish this MCS, the other wireless device (hereinafter the "controlled wireless device") may send information about its capabilities, information about the air interface between the devices, and other information to the controlling device. The calculated most complex MCS may be set such that the controlled wireless device is able to cancel out its own transmissions and still be able to receive the controlling device's transmissions and vice versa. The MCS calculation may assume reciprocal channel conditions (e.g., the uplink and downlink channel conditions are identical), and that the channel conditions will not change until the next update period. In some examples, additional historical data, safety margins, or both may also be factored into the MCS calculations.

Figure 1:
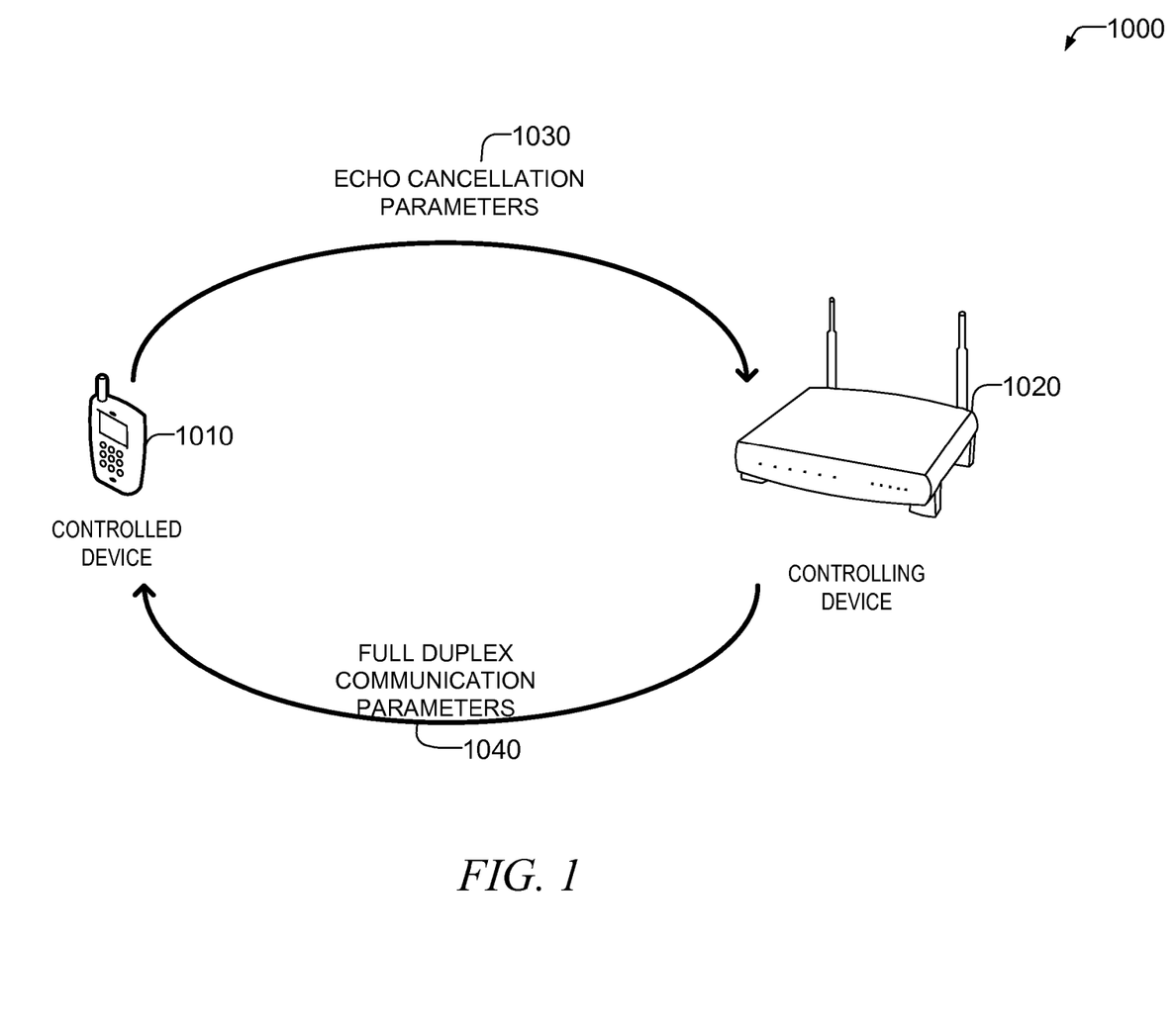
FIG. 1 shows a diagram of a configuration of a full duplex communication session according to some examples of the present disclosure.

Turning now to FIG. 1, a diagram 1000 of a configuration of a full duplex communication session is shown according to some examples of the present disclosure. Controlled device 1010 may be either a wireless device with limited echo cancellation capabilities or a wireless device with full echo cancellation capabilities. Controlling device 1020 may be either a wireless device with limited echo cancellation capabilities or may be a wireless device with full echo cancellation capabilities. In FIG. 1, the controlled device is depicted as a smart phone and the controlling device 1020 is depicted as an access point, but in other examples, a variety of different configurations may be utilized.

In some examples, to begin a full duplex communication period (e.g., session), the controlled device 1010 and the controlling device 1020 may exchange control frames (e.g., packets). These control frames may be or include a frame in which the controlled device 1010 may inform the controlling device 1020 of various echo cancellation parameters 1030. The controlling device 1020 may use these parameters to determine various full duplex communication parameters 1040 which are sent to the controlled device 1010 and used by both the controlled device 1010 and the controlling device 1020 to engage in full duplex communications. The session configuration may be done prior to starting the full duplex communications, periodically during the full duplex communication sessions, or both. This configuration may utilize any configuration or control messaging, such as 802.11 MAC Management messages.

An echo cancellation parameter may be any wireless transmission parameter which is related to the capabilities of a wireless device to cancel its own transmissions. Example echo cancellation parameters 1030 sent to the controlling wireless device by the controlled wireless device may include one or more of:

The amount of echo cancellation of which the controlled wireless device is capable of. In some examples, this may a fixed value. In some examples, the amount of echo cancellation may vary depending on the transmission power. The echo cancellation may be in the form of a table with echo cancellation capability given for ranges of transmission powers.

The Receiver Noise Figure for the controlled wireless device. In some examples this may be a static value and is used for cases in which the echo cancellation noise power is roughly the same as the receiver noise power.

The maximum (most complex) MCS to be used in a given full-duplex period. This may be fixed for long periods of time (e.g., many full-duplex periods) or may vary.

Transmit power information. This is the transmission power used to transmit a frame that may be used to set up the full duplex period (e.g., a control frame, the frame used to send the echo cancellation parameters such as 1030, or the like). It may allow the controlling device to determine the path loss between the controlling device and the controlled device. If the transmit power used by the controlled device is not constant throughout the full duplex period, it may provide a range of transmit powers that will be used.

Duration of the full-duplex period. This is the duration of the full-duplex period. In some examples this may be sent in an initiating Request to Send (RTS) Medium Access and Control (MAC) frame.

The full duplex communication parameters (e.g., an MCS, a transmission power, and the like) may be set by the controlling device subject to the following conditions:

1. (Transmission power of controlled device−path loss−SINR required for a particular MCS (from the controlled device to the controlling device))>(controlling device Tx power−controlling device echo cancellation); AND
2. (Transmission power of controlling device−path loss−SINR required for a particular MSC (from the controlling device to the controlled device))>(controlled device Tx power−controlled device echo cancellation.)

More formally, these relationships can be expressed (with B being the controlled wireless device and A being the controlling wireless device) as:

$T_B - PL - SINR_{BA} > T_A - EC_A$ $T_A - PL - SINR_{AB} > T_B - EC_B$

Within these constraints, a variety of full duplex communication parameters may be selected. A full duplex communication parameter may be any wireless communication transmission or reception parameter used in a wireless full duplex communication session. The full duplex communication parameters may be explicit parameters, for example an exact MCS to use in transmissions; thresholds, for example a maximum MCS to use in transmissions; or ranges, for example a range or selection of valid MCSs to use in transmissions. If the full duplex communication parameters are ranges or thresholds, the controlled device 1010 may select any valid parameter within the range or below the threshold. If the full duplex communication parameters are explicit parameters, the controlled device 1010 may use the explicit value provided by the controlling device 1020.

In some examples, the wireless communications may be configured for throughput where both wireless devices will try and use the most complex MCS possible. This will allow the maximum amount of data to be transferred between the devices. In other examples, the controlling wireless device may pick the maximum possible MCS for either the uplink or downlink wireless links while the other wireless link may use a low complexity MCS and/or low transmit power because it is used to provide only acknowledgements. The controlled device 1010 and controlling device 1020 may negotiate the desired MCSs. In some examples, for maximum throughput, the point within the full duplex period at which acknowledgement information (in some examples in the form of unsolicited block ACKs) will start can be provided to allow device B the ability to determine when it should switch from data to acknowledgements.

During a full duplex period, it may be desirable for both devices to transmit without waiting on the other device, this may be accomplished by unsolicited block ACs. Rather than using block acknowledgments, allowing immediate-response frames (e.g., immediate ACKs) would add complexity related to the typical SIFS timing of the response frames. However, a frame that requires an immediate-response would force one device to wait for the response from the other one.

For example, if a data frame from device A to device B expects an immediate acknowledgement (ACK) from device B to device A. In a full duplex mode, device A would wait until device B: finishes whatever frame it is transmitting, delays a SIFS period, and transmits an ACK. With this example, the rules related to SIFS get more complex, and the overall throughput drops. It is far easier to use block ACKs and not have any immediate-response frames in the full duplex period to allow each device can choose what to send independent of what the other device is sending.

Wireless devices having multiple antennas can utilize normal Multiple Input, Multiple Output (MIMO) techniques when communicating with a similar multiple antenna wireless device. In some examples, if a MIMO device is engaging in full duplex communications with a non-MIMO device, the MIMO device may utilize one or more of its antennas for full duplex use. For example, if a single antenna device (a non MIMO device) is communicating with a two antenna device (MIMO device), the MIMO device may utilize one antenna for transmission and one antenna for reception. In these examples, less echo cancellation circuitry may be necessary at the wireless device utilizing MIMO as the separation between antennas provides for a reduction in the interference and thus a reduction in the amount of echo cancellation necessary. For example, in this case, a wireless device with limited echo cancellation capabilities may have full echo cancellation capabilities as a result of this configuration.

Figure 2:
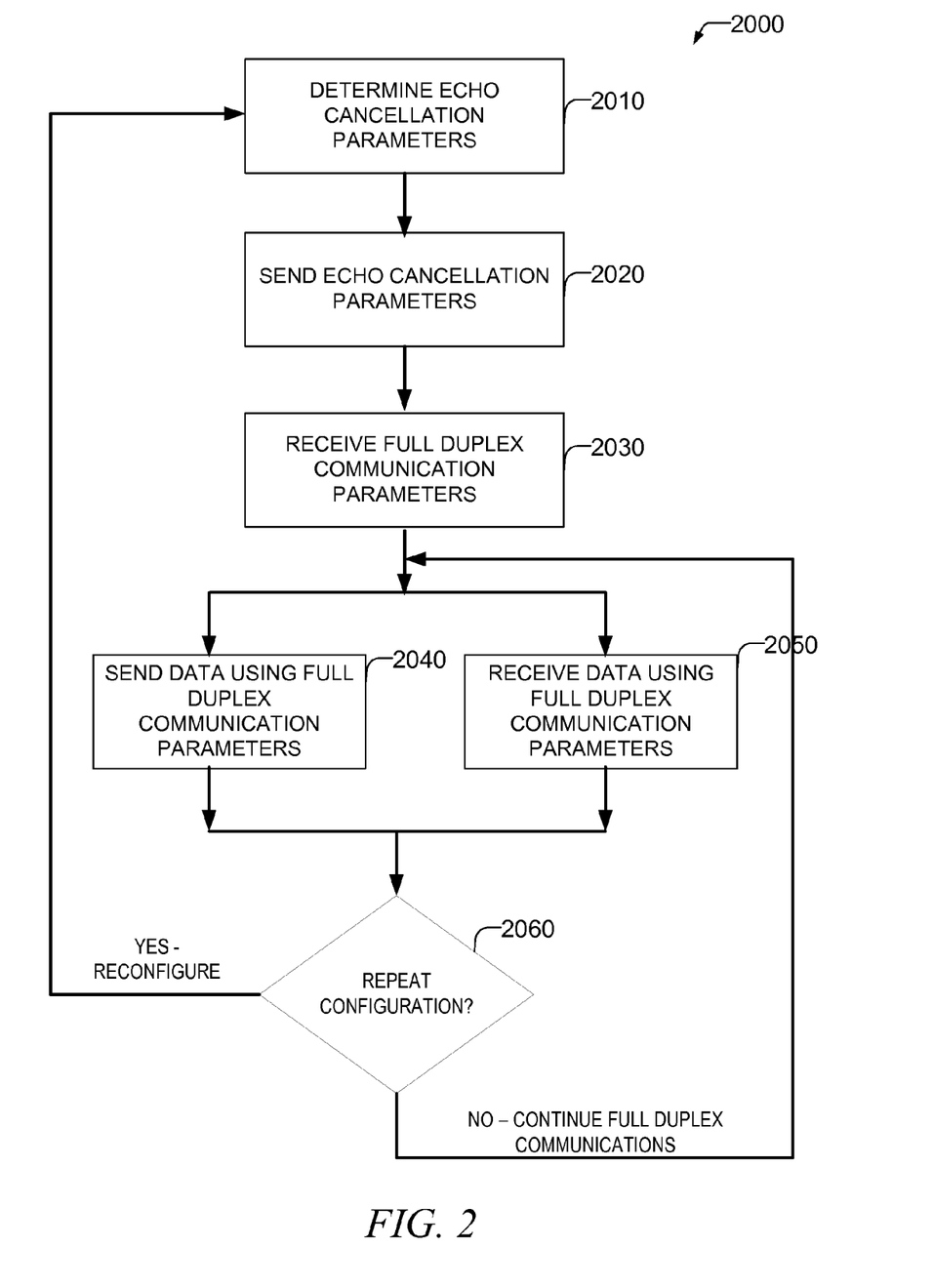
FIG. 2 shows a method of configuring full duplex communications among wireless devices that is performed by a controlled wireless device when at least one of the wireless devices possesses limited echo cancellation abilities according to some examples of the present disclosure.

Turning now to FIG. 2, a method of configuring full duplex communications 2000 among wireless devices when at least one of the wireless devices possesses limited echo cancellation abilities is shown. The method of FIG. 2 may be performed by a controlled wireless device. At operation 2010 the controlled wireless device may determine its echo cancellation parameters. The echo cancellation parameters may include one or more of: the amount of echo cancellation the device is capable of, the receiver noise figure, the maximum MCS available, transmit power, one or more parameters of the wireless medium (e.g., Received Signal Strength Indication—RSSI), and duration of the full-duplex communication session, etc. In some examples, the parameters may be determined based upon one or more "hard coded" values, by querying various components of the wireless device (e.g., by sending a message to the echo cancellation circuitry), by measuring the wireless medium, by measuring an amount of echo that can be successfully cancelled, or the like.

At operation 2020 these echo cancellation parameters may be sent to the controlling device. The controlling device may use these parameters to calculate full duplex communication parameters which may be sent back to the controlled device by the controlling device. At operation 2030, the full duplex communication parameters may be received by the controlled device. The full duplex communication parameters may include one or more of: an MCS for the uplink, an MCS for the downlink wireless link, transmission power for the uplink wireless link, transmission power for the downlink wireless link, etc.

At operations 2040 and 2050 the controlled device may utilize the full duplex communication parameters to transmit and receive data simultaneously in a full duplex mode. For example, when sending packets to the controlling wireless device the controlled device may utilize the MCS for the downlink selected by the controlling wireless device.

At operation 2060, a determination may be made of whether or not a new configuration is needed. For example, the full duplex system may be setup to reconfigure the transmission parameters based upon a triggering event. Triggering events may include an expiry of a predetermined amount of time since a previous configuration was determined, a change in the properties of the wireless connection, a message from the controlling device to reconfigure, and the like. Changes in the properties of the wireless connection may include exceeding a predetermined threshold of lost, dropped, or bad packets, a change in the RSSI, or the like. In some examples a reconfiguration is not needed as the full duplex communication parameters received at operation 2030 are used the entire full duplex communication session without modification.

If at 2060 it is determined that a change in configuration is needed, operations 2010-2020 are repeated and a new configuration may be received at operation 2030. This new configuration may be utilized at operations 2040 and 2050. If at 2060, no configuration change is desired, operations 2040 and 2050 continue with the current configuration.

In some examples, to determine which wireless device is the controlling device and which is the controlled device, prior control messaging is utilized. The controlling device may be chosen based upon processing power, battery power, preferred device type (e.g., it may be the case that an access point may be a preferred controlling device), echo cancellation capabilities (e.g., whichever device has the more complete echo cancellation capabilities may be the controlling device), etc.

Figure 3:
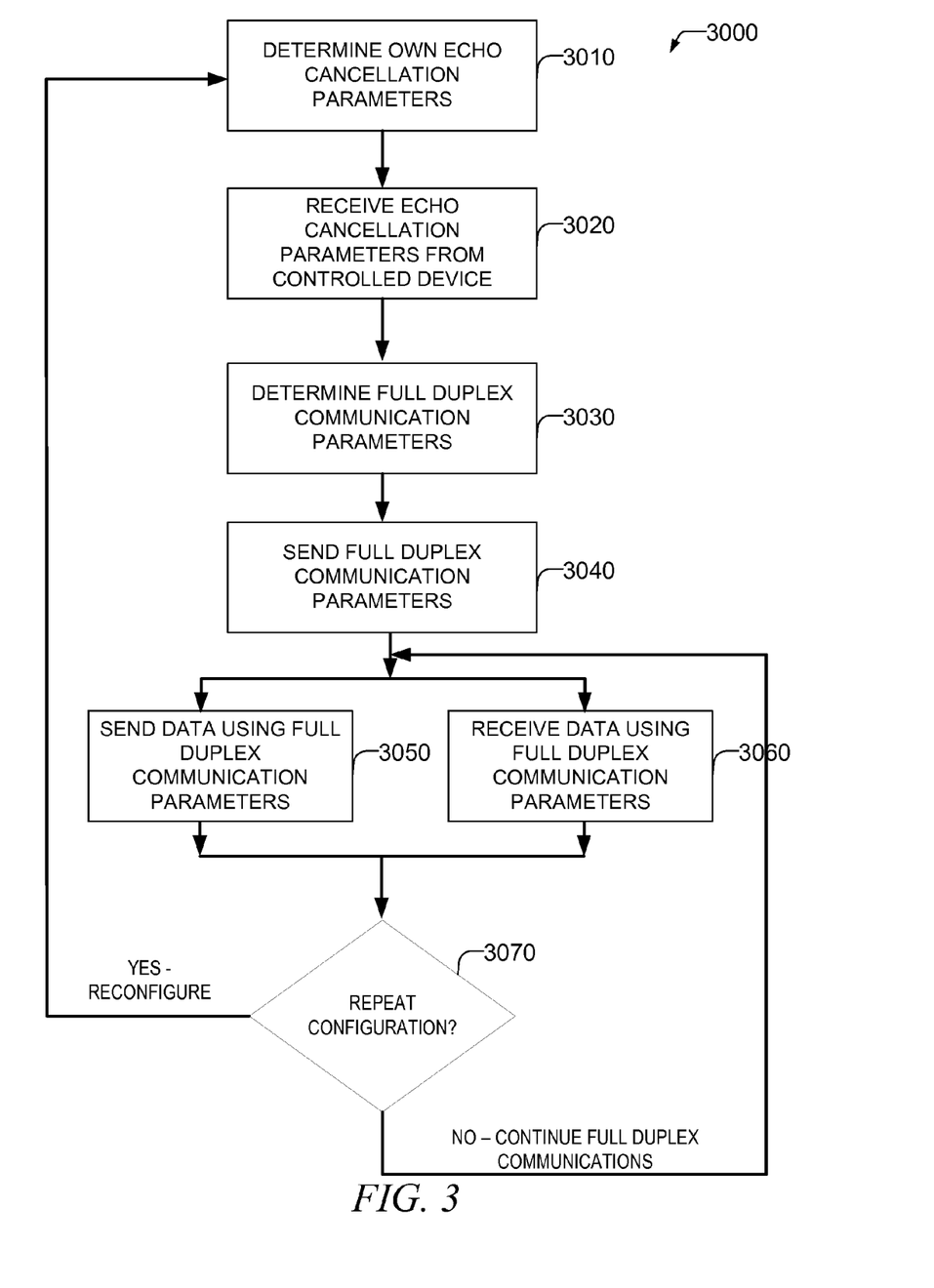
FIG. 3 shows a method of configuring full duplex communications among wireless devices that is performed by a controlling wireless device when at least one of the wireless devices possesses limited echo cancellation abilities according to some examples of the present disclosure.

Turning now to FIG. 3, a method of configuring full duplex communications 3000 among wireless devices when at least one of the wireless devices possesses limited echo cancellation abilities is shown. FIG. 3 may be performed by a controlling device. At operation 3010 the controlling wireless device may determine its own echo cancellation parameters. These may be determined in the same way that the controlled device determined its echo cancellation parameters at operation 2010 from FIG. 2. The echo cancellation parameters may include one or more of: the amount of echo cancellation the device is capable of, the receiver noise figure, the maximum MCS available, transmit power, one or more parameters of the wireless medium (e.g., Received Signal Strength Indication—RSSI), and duration of the full-duplex communication session.

At operation 3020 the echo cancellation parameters may be received from the controlled device. The controlling device may use the parameters received from the controlled device as well as the echo cancellation parameters calculated for itself to calculate full duplex communication parameters at operation 3030. In some examples, the controlling device may utilize the equations shown above to calculate the full duplex communication parameters. The controlling device may prefer to maximize throughput (e.g., a maximum MCS for both uplink and downlink communications) or latency (e.g., a maximum MCS for either the uplink or downlink, and a lower MCS or transmission power for the other link), or a mix of the two. The determination of the MCS may be done so as to satisfy the previously given constraints. Within these constraints, an MCS may be chosen to maximize the goals of the full duplex communication session. These goals may be pre-communicated between the communication participants.

The full duplex parameters may be sent to the controlled device at operation 3040. The full duplex communication parameters may include one or more of: an MCS for transmitting data, a transmission power, an MCS for receiving data, and the like. At operations 3050 and 3060 the controlling device may utilize the full duplex communication parameters to transmit and receive data simultaneously in a full duplex mode.

At operation 3070, a determination is made of whether or not a new configuration is needed. For example, the full duplex system may be setup to reconfigure the transmission parameters based upon a triggering event. Triggering events may include an expiry of a predetermined amount of time since a previous configuration was determined, a change in the properties of the wireless connection, a message from the controlled device to reconfigure, and the like. Changes in the properties of the wireless connection may include exceeding a predetermined threshold of lost, dropped, or bad packets, a change in the RSSI, or the like.

If at 3060 it is determined that a change in configuration is desired, operations 3010-3040 are repeated. This new configuration may be utilized at operations 3050 and 3060. If at 3070, no configuration change is desired, operations 3050 and 3070 continue with the current configuration.

Figure 4:
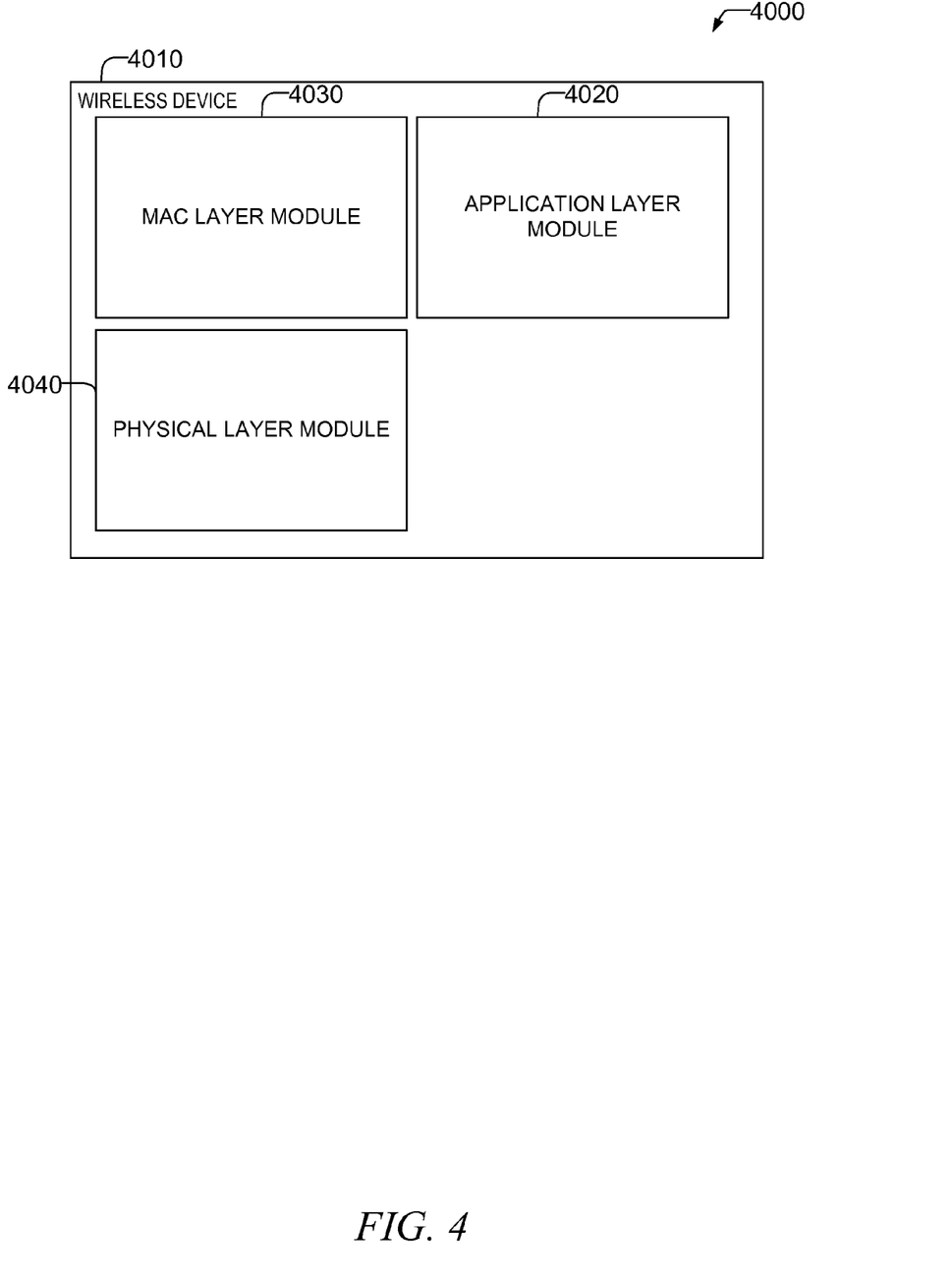
FIG. 4 shows a schematic of a wireless device according to some examples of the present disclosure.

FIG. 4 shows a schematic of an example wireless device 4010 (e.g., a station (STA) or an access point (AP)) which is capable of full-duplex communication according to some examples of the present disclosure. The device 4010 may be any wireless device capable of full-duplex communication with any other wireless device and may be a controlling wireless device or a controlled wireless device. Device 4010 may have limited echo cancellation capabilities. Device 4010 may have full echo cancellation capabilities. Wireless devices 4010 may take on a role as an access point (AP), a station (STA), or the like. Example wireless devices 4010 may include any computing device capable of wireless communication. Examples include desktops, laptops, smartphones, cellular phones, tablets, and the like. The device 4010 may include an application layer module 4020. The application layer module 4020 may include various protocol layers of a protocol stack, such as an Open Systems Interconnection model (OSI) protocol stack or a similar stack. For example, the application layer module 4020 may implement one or more data link layer protocols (e.g., a logical link control), network layer protocols (e.g., internet protocol (IP)), transport layer protocols (e.g., transmission control protocol (TCP)), session layer protocols, presentation layer protocols, and application layer protocols (e.g., a file transfer protocol (FTP), a hypertext transfer protocol (HTTP)). The application layer module 4020 may pass data to send to another wireless device to a MAC layer module 4030 in the form of a MAC Service Data Unit (MSDU). The application layer module 4020 may receive data from other devices through the MAC layer module 4030 in the form of a MSDU.

The MAC layer module 4030 may implement an 802.11 MAC protocol which may provide, among other things, addressing and channel access control implemented according to an 802.11 family of wireless standards. The MAC layer may receive the MSDU from the application layer module 4020 and deliver the data to a physical layer module 4040 in the form of a Physical Service Data Unit (PSDU). The MAC layer may receive data from other devices through the physical layer module 4040 in the form of Physical Service Data Unit (PSDU). The term protocol as used herein may be the means by which entities in the layered protocol model exchange data and control information with other layers and with their peer entities on other devices. This exchange may take place through protocol data units (PDUs). For example, the MAC layer module 4030 of device 4010 may communicate with another MAC layer module of another wireless device through an exchange of MAC PDUs (MPDUs). The physical (PHY) layer module 4040 may communicate with another PHY layer module in another wireless device through a Physical PDU (PPDU).

The MAC layer module 4030 may cause the PHY layer module 4040 to transmit user data, acknowledgements, block acknowledgements, negative acknowledgements, and the like to one or more other devices. In some examples MAC layer module 4030 may communicate with another MAC layer module from another wireless device to determine which device is the controlling device and which device is the controlled device. MAC layer module 4030 may determine the wireless device's echo cancellation parameters, cause the PHY layer module 4040 to transmit the echo cancellation parameters (if the wireless device is a controlled device), receive from the PHY layer the full duplex communication parameters, and use the full duplex communication parameters to send and receive packets in the full duplex communications. MAC layer module 4030 may also determine when a triggering event occurs which may require a reconfiguration of the full duplex communication parameters and initiate such a reconfiguration.

In other examples, if the wireless device is a controlling device, the MAC layer module 4030 may also receive the echo cancellation parameters of the controlled device and using the echo cancellation parameters of the controlled device and its own calculated echo cancellation parameters calculate the full duplex communication parameters. The MAC layer module 4030 may then send the full duplex communication parameters to the controlled wireless device through the PHY layer module 4040. The MAC layer module 4030 may implement the methods shown in FIGS. 1-3.

The physical layer module 4040 may implement an 802.11 physical layer protocol which may provide wireless transmission mechanisms for the MAC layer module 4030 through the scrambling, coding, interleaving, symbol mapping and modulation as well as through measurements of the wireless medium and subsequent reporting of those measurements to the MAC layer. The physical layer module 4040 may include or control an echo canceller circuitry.

Figure 5:
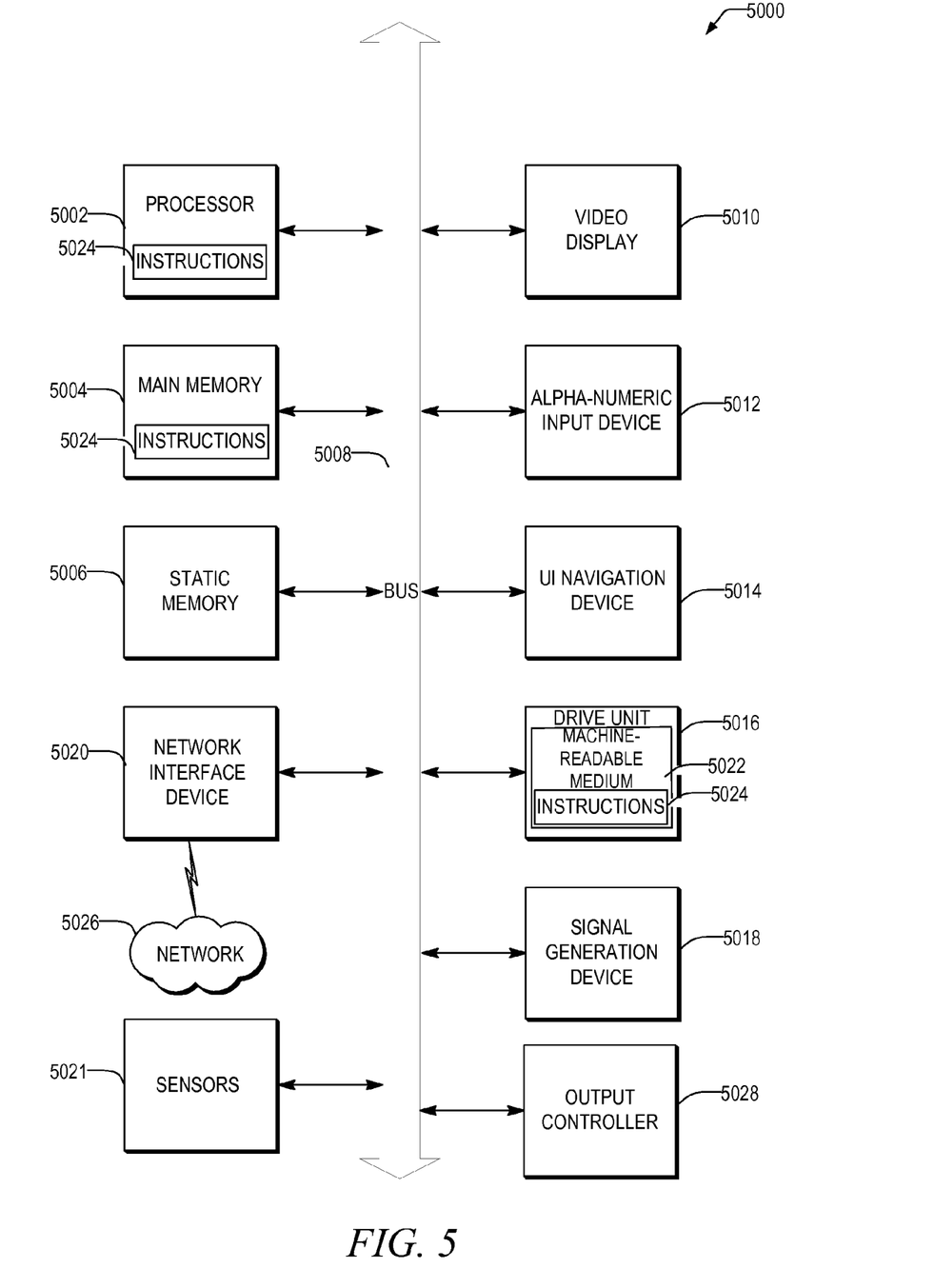
FIG. 5 shows a block diagram illustrating an example of a machine upon which one or more embodiments may be implemented according to some examples of the present disclosure.

FIG. 5 illustrates a block diagram of an example machine 5000 upon which any one or more of the techniques (e.g., methodologies) discussed herein may be performed. In alternative embodiments, the machine 5000 may operate as a standalone device or may be connected (e.g., networked) to other machines. In a networked deployment, the machine 5000 may operate in the capacity of a server machine, a client machine, or both in server-client network environments. In an example, the machine 5000 may act as a peer machine in peer-to-peer (P2P) (or other distributed) network environment. The machine 5000 may be an access point (AP), a station (STA), a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. For example, the machine 5000 may be configured to include the components of FIG. 4 and execute the methods of FIGS. 2-3. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 5000 may include a hardware processor 5002 (e.g., a central processing unit (CPU), a graphics processing unit (GPU), a hardware processor core, or any combination thereof), a main memory 5004 and a static memory 5006, some or all of which may communicate with each other via an interlink (e.g., bus) 5008. The machine 5000 may further include a display unit 5010, an alphanumeric input device 5012 (e.g., a keyboard), and a user interface (UI) navigation device 5014 (e.g., a mouse). In an example, the display unit 5010, input device 5012 and UI navigation device 5014 may be a touch screen display. The machine 5000 may additionally include a storage device (e.g., drive unit) 5016, a signal generation device 5018 (e.g., a speaker), a network interface device 5020, and one or more sensors 5021, such as a global positioning system (GPS) sensor, compass, accelerometer, or other sensor. The machine 5000 may include an output controller 5028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 5016 may include a machine readable medium 5022 on which is stored one or more sets of data structures or instructions 5024 (e.g., software) embodying or utilized by any one or more of the techniques or functions described herein. The instructions 5024 may also reside, completely or at least partially, within the main memory 5004, within static memory 5006, or within the hardware processor 5002 during execution thereof by the machine 5000. In an example, one or any combination of the hardware processor 5002, the main memory 5004, the static memory 5006, or the storage device 5016 may constitute machine readable media.

While the machine readable medium 5022 is illustrated as a single medium, the term "machine readable medium" may include a single medium or multiple media (e.g., a centralized or distributed database, and/or associated caches and servers) configured to store the one or more instructions 5024.

The term "machine readable medium" may include any medium that is capable of storing, encoding, or carrying instructions for execution by the machine 5000 and that cause the machine 5000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 5024 may further be transmitted or received over a communications network 5026 using a transmission medium via the network interface device 5020. The Machine 5000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 5020 may include one or more physical jacks (e.g., Ethernet, coaxial, or phone jacks) or one or more antennas to connect to the communications network 5026. In an example, the network interface device 5020 may include a plurality of antennas to wirelessly communicate using at least one of single-input multiple-output (SIMO), multiple-input multiple-output (MIMO), or multiple-input single-output (MISO) techniques. In some examples, the network interface device 5020 may wirelessly communicate using Multiple User MIMO techniques.

OTHER NOTES AND EXAMPLES

Example 1 includes subject matter (such as a method, means for performing acts, machine readable medium including instructions that when performed by a machine cause the machine to perform acts, or an apparatus configured to perform) for configuring a full duplex communication, comprising: at a wireless device, using one or more processors, the one or more processors configured to: determine an echo cancellation parameter; send the echo cancellation parameter to a controlling wireless device; receive a full duplex communication parameter, the full duplex communication parameter determined by the controlling wireless device based upon the echo cancellation parameter; and responsive to receiving the full duplex communication parameter, simultaneously transmitting packets to and receiving packets from the controlling wireless device using the full duplex communication parameter on the same wireless channel.

In example 2, the subject matter of example 1 may optionally include wherein the wireless device has limited echo cancellation capabilities, and wherein the full duplex communication parameter is calculated to allow echo cancellation circuitry of the wireless device to cancel a transmission made by the wireless device.

In Example 3, the subject matter of any one or more of examples 1-2 may optionally include wherein the controlling wireless device has limited echo cancellation capabilities.

In Example 4, the subject matter of any one or more of examples 1-3 may optionally include wherein the echo cancellation parameter is one of: an amount of echo cancellation the wireless device is capable of, a receiver noise figure, a maximum modulation and coding scheme (MCS), a measurement of the wireless medium, a transmission power, and a full-duplex period duration.

In Example 5, the subject matter of any one or more of examples 1-4 may optionally include wherein the full duplex communication parameter is a modulation and coding scheme (MCS).

In Example 6, the subject matter of any one or more of examples 1-5 may optionally include wherein the wireless device and the controlling wireless device operate according to one of an 802.11 family of standards.

In Example 7 the subject matter of any one or more of examples 1-6 may optionally include wherein the wireless device includes a first and a second antenna, and wherein simultaneously transmitting packets to and receiving packets from the controlling wireless device comprises using the first antenna for receiving the packets and the second antenna for transmitting the packets to the controlling wireless device.

In Example 8, the subject matter of any one or more of examples 1-7 may optionally include wherein the wireless device includes a first antenna and wherein simultaneously transmitting packets to and receiving packets from the controlling wireless device comprises using the first antenna to both receive the packets and transmit the packets.

In Example 9, the subject matter of any one or more of examples 1-8 may optionally include sending a block acknowledgment acknowledging a plurality of received packets.

In Example 10, the subject matter of any one or more of examples 1-9 may optionally include receiving a packet that requires an immediate response and in response: waiting until a current packet is finished transmission; waiting a predetermined amount of time; and transmitting an acknowledgment to the packet that requires an immediate response.

In Example 11, the subject matter of any one or more of examples 1-10 may optionally include wherein the controlling wireless device is an access point (AP).

In Example 12, the subject matter of any one or more of examples 1-11 may optionally include wherein the controlling wireless device is a station (STA).

In Example 13, the subject matter of any one or more of examples 1-12 may optionally include wherein the wireless device is a STA.

In Example 14, the subject matter of any one or more of examples 1-13 may optionally include wherein the wireless device is an AP.

Example 15 includes or may optionally be combined with the subject matter of any one of examples 1-14 to include subject matter (such as a method, means for performing acts, machine readable medium including instructions, that, when performed by a machine cause the machine to perform acts, or an apparatus configured to perform) for configuring a full duplex communication, comprising: at a wireless device, using one or more processors, the one or more processors configured to: determine a first echo cancellation parameter specific to the wireless device; receive a second echo cancellation parameter from a controlled wireless device; calculate a full duplex communication parameter, the full duplex communication parameter determined based upon the first and second echo cancellation parameters; send the full duplex communication parameter to the controlled wireless device; and responsive to receiving the full duplex communication parameter, simultaneously transmitting packets to and receiving packets from the controlled wireless device using the full duplex communication parameter on the same wireless channel.

In Example 16, the subject matter of any one or more of examples 1-15 may optionally include wherein the wireless device has limited echo cancellation capabilities and wherein the full duplex communication parameter is calculated to allow echo cancellation circuitry of the wireless device to cancel a transmission made by the wireless device and to allow echo cancellation circuitry of the controlled wireless device to cancel a transmission made by the controlled wireless device.

In Example 17, the subject matter of any one or more of examples 1-16 may optionally include wherein the full duplex communication parameter is a modulation and coding scheme (MCS) which is calculated so as to prioritize a connection throughput between the wireless device and the controlled wireless device over a connection latency between the wireless device and the controlled wireless device.

In Example 18, the subject matter of any one or more of examples 1-17 may optionally include wherein the full duplex communication parameter is a modulation and coding scheme (MCS) which is calculated so as to prioritize a connection latency between the wireless device and the controlled wireless device over a connection throughput between the wireless device and the controlled wireless device.

In Example 19, the subject matter of any one or more of examples 1-18 may optionally include wherein the controlled wireless device has limited echo cancellation capabilities.

In Example 20, the subject matter of any one or more of examples 1-19 may optionally wherein the echo cancellation parameter is one of: an amount of echo cancellation the wireless device is capable of, a receiver noise figure, a maximum modulation and coding scheme (MCS), a measurement of the wireless medium, a transmission power, and a full-duplex period duration.

In Example 21, the subject matter of any one or more of examples 1-20 may optionally include wherein the full duplex communication parameter is a modulation and coding scheme (MCS).

In Example 22, the subject matter of any one or more of examples 1-21 may optionally include wherein the wireless device and the controlled wireless device operate according to one of an 802.11 family of standards.

In Example 23, the subject matter of any one or more of examples 1-22 may optionally include wherein the wireless device includes a first and a second antenna, and wherein simultaneously transmitting packets to and receiving packets from the wireless device comprises using the first antenna for receiving the packets and the second antenna for transmitting the packets to the controlled wireless device.

In Example 24, the subject matter of any one or more of examples 1-23 may optionally include wherein the wireless device includes a first antenna and wherein simultaneously transmitting packets to and receiving packets from the controlled wireless device comprises using the first antenna to both receive the packets and transmit the packets.

In Example 25, the subject matter of any one or more of examples 1-24 may optionally include wherein the controlled wireless device is an access point (AP).

In Example 26, the subject matter of any one or more of examples 1-25 may optionally include wherein the controlled wireless device is a station (STA).

In Example 27, the subject matter of any one or more of examples 1-26 may optionally include wherein the wireless device is a STA.

In Example 28, the subject matter of any one or more of examples 1-27 may optionally include wherein the wireless device is an AP.

Example 29 includes or may optionally be combined with the subject matter of any one of examples 1-28 to include subject matter (such as a device, apparatus, or machine) comprising a memory and one or more processors configured to include: a Medium Access Control (MAC) layer module configured to: determine an echo cancellation parameter; send the echo cancellation parameter to a controlling wireless device; receive a full duplex communication parameter, the full duplex communication parameter determined by the controlling wireless device based upon the echo cancellation parameter; and responsive to receiving the full duplex communication parameter, cause a physical layer module to simultaneously transmitting packets to and receiving packets from the controlling wireless device using the full duplex communication parameter on the same wireless channel.

In Example 30, the subject matter of any one or more of examples 1-29 may optionally include wherein the wireless device has limited echo cancellation capabilities, and wherein the full duplex communication parameter is calculated to allow echo cancellation circuitry of the wireless device to cancel a transmission made by the wireless device.

In Example 31, the subject matter of any one or more of examples 1-30 may optionally include wherein the controlling wireless device has limited echo cancellation capabilities.

In Example 32, the subject matter of any one or more of examples 1-31 may optionally include wherein the echo cancellation parameter is one of: an amount of echo cancellation the wireless device is capable of, a receiver noise figure, a maximum modulation and coding scheme (MCS), a measurement of the wireless medium, a transmission power, and a full-duplex period duration.

In Example 33, the subject matter of any one or more of examples 1-32 may optionally include wherein the full duplex communication parameter is a modulation and coding scheme (MCS).

In Example 34, the subject matter of any one or more of examples 1-33 may optionally include wherein the wireless device and the controlling wireless device operate according to one of an 802.11 family of standards.

In Example 35, the subject matter of any one or more of examples 1-34 may optionally include wherein the wireless device includes a first and a second antenna, and wherein the physical layer is configured to simultaneously transmit packets to and receive packets from the controlling wireless device using the first antenna for receiving the packets and the second antenna for transmitting the packets to the controlling wireless device.

In Example 36, the subject matter of any one or more of examples 1-35 may optionally include wherein the wireless device includes a first antenna and wherein the physical layer is configured to simultaneously transmit packets to and receive packets from the controlling wireless device using the first antenna to both receive the packets and transmit the packets.

In Example 37, the subject matter of any one or more of examples 1-36 may optionally include wherein the MAC layer module is configured to send a block acknowledgment acknowledging a plurality of received packets.

In Example 38, the subject matter of any one or more of examples 1-37 may optionally include wherein the MAC layer module is configured to: receive a packet that requires an immediate response and in response: wait until a current packet is finished transmission; wait a predetermined amount of time; and cause an acknowledgment to the packet that requires an immediate response to be transmitted.

In Example 39, the subject matter of any one or more of examples 1-38 may optionally include wherein the controlling wireless device is an access point (AP).

In Example 40, the subject matter of any one or more of examples 1-39 may optionally include wherein the controlling wireless device is a station (STA).

In Example 41, the subject matter of any one or more of examples 1-40 may optionally include wherein the wireless device is a STA.

In Example 42, the subject matter of any one or more of examples 1-41 may optionally include wherein the wireless device is an AP.

In Example 43, includes or may optionally be combined with the subject matter of any one of Examples 1-42 to include subject matter (such as a device, apparatus, or machine) comprising: a memory and one or more processors configured to include: a Medium Access Control (MAC) layer module configured to: determine a first echo cancellation parameter specific to the wireless device; receive a second echo cancellation parameter from a controlled wireless device; calculate a full duplex communication parameter, the full duplex communication parameter determined based upon the first and second echo cancellation parameters; send the full duplex communication parameter to the controlled wireless device; and responsive to receiving the full duplex communication parameter, cause a physical layer module to simultaneously transmitting packets to and receiving packets from the controlled wireless device using the full duplex communication parameter on the same wireless channel.

In Example 44, the subject matter of any one or more of examples 1-43 may optionally include wherein the wireless device has limited echo cancellation capabilities and wherein the MAC layer is configured to calculate the full duplex communication parameter to allow echo cancellation circuitry of the wireless device to cancel a transmission made by the wireless device and to allow echo cancellation circuitry of the controlled wireless device to cancel a transmission made by the controlled wireless device.

In Example 45, the subject matter of any one or more of examples 1-44 may optionally include wherein the MAC layer is configured to calculate the MCS so as to prioritize a connection throughput between the wireless device and the controlled wireless device over a connection latency between the wireless device and the controlled wireless device.

In Example 46, the subject matter of any one or more of examples 1-45 may optionally include wherein the MAC layer is configured to calculate the MCS so as to prioritize a connection latency between the wireless device and the controlled wireless device over a connection throughput between the wireless device and the controlled wireless device.

In Example 47, the subject matter of any one or more of examples 1-46 may optionally include wherein the controlled wireless device has limited echo cancellation capabilities.

In Example 48, the subject matter of any one or more of examples 1-47 may optionally include wherein the echo cancellation parameter is one of: an amount of echo cancellation the wireless device is capable of, a receiver noise figure, a maximum modulation and coding scheme (MCS), a measurement of the wireless medium, a transmission power, and a full-duplex period duration.

In Example 49, the subject matter of any one or more of examples 1-48 may optionally include wherein the full duplex communication parameter is a modulation and coding scheme (MCS).

In Example 50, the subject matter of any one or more of examples 1-49 may optionally include wherein the wireless device and the controlled wireless device operate according to one of an 802.11 family of standards.

In Example 51, the subject matter of any one or more of examples 1-50 may optionally include wherein the wireless device includes a first and a second antenna, and wherein the physical layer is configured to simultaneously transmit packets to and receive packets from the wireless device comprises using the first antenna for receiving the packets and the second antenna for transmitting the packets to the controlled wireless device.

In Example 52, the subject matter of any one or more of examples 1-51 may optionally include wherein the wireless device includes a first antenna and wherein the physical layer is configured to simultaneously transmit packets to and receive packets from the controlled wireless device comprises using the first antenna to both receive the packets and transmit the packets.

In Example 53, the subject matter of any one or more of examples 1-52 may optionally include wherein the controlled wireless device is an access point (AP).

In Example 54, the subject matter of any one or more of examples 1-53 may optionally include wherein the controlled wireless device is a station (STA).

In Example 55, the subject matter of any one or more of examples 1-54 may optionally include wherein the wireless device is a STA.

In Example 56, the subject matter of any one or more of examples 1-55 may optionally include wherein the wireless device is an AP.

What is claimed is:

1. A non-transitory machine readable medium that stores instructions which when performed by a wireless device, cause the wireless device to perform operations for configuring a full duplex communication, the operations at least to:
  determine a first echo cancellation parameter specific to the wireless device;
  receive a second echo cancellation parameter from a controlled wireless device;
  calculate a full duplex communication parameter, the full duplex communication parameter determined based upon the first and second echo cancellation parameters;
  send the full duplex communication parameter to the controlled wireless device;
  provide the controlled wireless device an indication of a time within a full duplex period at which one of: the wireless device or the controlled wireless device transitions from sending data packets to block acknowledgement packets; and
  responsive to receiving the full duplex communication parameter, simultaneously transmitting packets to and receiving packets from the controlled wireless device using the full duplex communication parameter on the same wireless channel during the full duplex period,
  wherein the wireless device is not capable of cancelling out interference from transmissions at maximum power to a level at or below a noise floor of a receiver of the wireless device and wherein the operations to calculate the full duplex communication parameter comprise operations to at least calculate the full duplex communication parameter to allow echo cancellation circuitry of the wireless device to cancel a transmission made by the wireless device and to allow echo cancellation circuitry of the controlled wireless device to cancel a transmission made by the controlled wireless device.

2. The non-transitory machine readable medium of claim 1, wherein the full duplex communication parameter is a modulation and coding scheme (MCS) and wherein the operations to calculate the MCS comprise operations to at least calculate the MCS so as to prioritize a connection throughput between the wireless device and the controlled wireless device over a connection latency between the wireless device and the controlled wireless device.

3. The non-transitory machine readable medium of claim 1, wherein the full duplex communication parameter is a modulation and coding scheme (MCS) and wherein the operations to calculate the MCS comprise operations to at least calculate the MCS so as to prioritize a connection latency between the wireless device and the controlled wireless device over a connection throughput between the wireless device and the controlled wireless device.

4. The non-transitory machine readable medium of claim 1, wherein the second echo cancellation parameter is received in a Medium Access Control (MAC) management message and the full duplex communication parameter is sent in a MAC management message.

5. The non-transitory machine readable medium of claim 1, wherein the first echo cancellation parameter is one of: an amount of echo cancellation the wireless device is capable of, a receiver noise figure, a maximum modulation and coding scheme (MCS), a measurement of the wireless medium, a transmission power, and a full-duplex period duration.

6. The non-transitory machine readable medium of claim 1 wherein the full duplex communication parameter is a modulation and coding scheme (MCS).

7. A wireless device comprising:
  a memory and one or more processors configured to:
    determine a first echo cancellation parameter specific to the wireless device;
    receive a second echo cancellation parameter from a controlled wireless device;
    calculate a full duplex communication parameter, the full duplex communication parameter determined based upon the first and second echo cancellation parameters;

send the full duplex communication parameter to the controlled wireless device;

provide the controlled wireless device an indication of a time within a full duplex period at which one of: the wireless device or the controlled wireless device transitions from sending data packets to block acknowledgement packets; and responsive to receiving the full duplex communication parameter, cause a simultaneous transmission of packets to and receive packets from the controlled wireless device using the full duplex communication parameter on the same wireless channel during the full duplex period, wherein the wireless device is not capable of cancelling out interference from transmissions at maximum power to a level at or below a noise floor of a receiver of the wireless device, and wherein the one or more processors are configured to calculate the full duplex communication parameter to allow echo cancellation circuitry of the wireless device to cancel a transmission made by the wireless device and to allow echo cancellation circuitry of the controlled wireless device to cancel a transmission made by the controlled wireless device.

8. The wireless device of claim 7, wherein the one or more processors are configured to calculate a Modulation and Coding Scheme (MCS) so as to prioritize a connection throughput between the wireless device and the controlled wireless device over a connection latency between the wireless device and the controlled wireless device.

9. The wireless device of claim 7, wherein the one or more processors are configured to calculate a Modulation and Coding Scheme (MCS) so as to prioritize a connection latency between the wireless device and the controlled wireless device over a connection throughput between the wireless device and the controlled wireless device.

10. The wireless device of claim 7, comprising an antenna.

* * * * *